(12) United States Patent
Frank et al.

(10) Patent No.: US 8,407,099 B1
(45) Date of Patent: Mar. 26, 2013

(54) TRAVEL SUGGESTIONS

(75) Inventors: Stefan Frank, Belmont, MA (US);
Rodney Daughtrey, Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/217,021

(22) Filed: Aug. 24, 2011

(51) Int. Cl.
*G06Q 30/00* (2006.01)
(52) U.S. Cl. .................................................. 705/26.1
(58) Field of Classification Search ............... 705/26.1
See application file for complete search history.

(56) References Cited

U.S. PATENT DOCUMENTS

2011/0213787 A1* 9/2011 Cerny ........................... 707/749

* cited by examiner

*Primary Examiner* — Mila Airapetian
(74) *Attorney, Agent, or Firm* — Fish & Richardson P.C.

(57) ABSTRACT

Methods, systems, and apparatus, including computer programs encoded on a computer storage medium, for providing travel suggestions. In one aspect, a method includes the action of providing a travel search interface, the travel search interface including one or more travel parameters and a suggestion of one or more people to visit from among a specified collection of individuals; receiving a user selection of a suggested person; providing one or more date range and price combinations for traveling to a city associated with the selected suggested person; and generating a travel itinerary for the selected travel date range.

36 Claims, 9 Drawing Sheets

TRAVEL SUGGESTIONS

BACKGROUND

This specification relates to providing travel suggestions.

Conventionally, users can plan travel using a number of travel resources. These resources can include travel websites or applications as well as traditional human travel agents.

Typically, when a user plans travel, the user specifies a number of travel parameters, for example, destination location and dates of travel. The particular travel resource then provides travel results satisfying those parameters.

SUMMARY

This specification describes technologies relating to presenting travel suggestions.

A travel search interface, for example as part of a travel search application, can provide a suggestion of a person to visit. The suggested person can be selected at random from a collection of individuals associated with the user. The collection of individuals can be associated with the user based on access to a user's account on a social site or individually specified by the user. Thus, in some implementations, while the user can define a collection of individuals, the suggested person can be unpredictable by the user. The suggestion of a person to visit can include presenting pricing information for one or more different travel dates. Users can request a new suggestion or manually select a person from the collection of individuals. Based on a selection of a person and travel dates, the user can provide input for building a travel itinerary.

In general, one innovative aspect of the subject matter described in this specification can be embodied in methods that include the actions of providing a travel search interface, the travel search interface including one or more travel parameters and a suggestion of one or more people to visit from among a specified collection of individuals; receiving a user selection of a suggested person; providing one or more date range and price combinations for traveling to a city associated with the selected suggested person; and generating a travel itinerary for the selected travel date range. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method further includes receiving a user input requesting a new suggestion of one or more people to visit; and presenting the new suggestion of one or more people. Providing one or more date range and price combinations includes providing a price for travel over a specified number of future weekends. Providing the suggestion is performed in response to a trigger criteria, the trigger criteria being associated with a number of people in a social group of the user. Generating a travel itinerary includes receiving a user selection of two or more flight legs for the date range. The date range and price combinations are pre computed for each of a plurality of people available as suggestions. The suggestion is randomly generated.

In general, one innovative aspect of the subject matter described in this specification can be embodied in methods that include the actions of providing a travel search interface, the travel search interface including identifiers for a plurality of people; receiving a selection of a particular person of the plurality of people; providing one or more date range and price combinations for traveling to a city associated with the selected person; and generating a travel itinerary for the selected travel date range. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The plurality of people belong to a user specified group. The user interface allows the user to scroll through the plurality of people. Generating a travel itinerary includes receiving a user selection of two or more flight legs for the date range. The date range and price combinations are pre computed for each of a plurality of people available as suggestions.

Particular embodiments of the subject matter described in this specification can be implemented so as to realize one or more of the following advantages. Travel can be suggested to users based on each user's associations with a collection of individuals. Randomly suggesting people to visit can provide the user with an unpredicted suggestion, leading to new travel ideas.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
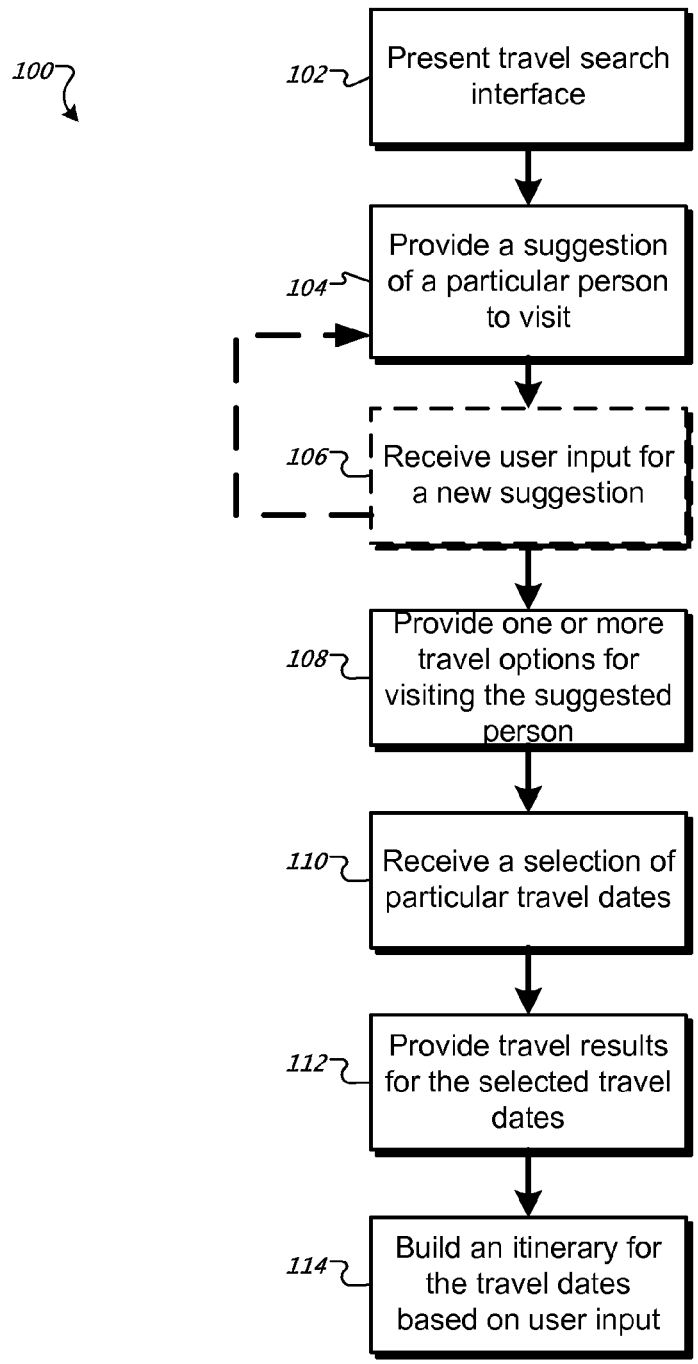
FIG. 1 is a flow diagram of an example process for suggesting travel.

FIG. 1 is a flow diagram of an example process 100 for suggesting travel. For convenience, the process 100 will be described with respect to a system, including one or more computers, that performs the process 100.

The system presents a travel search interface (step 102). The travel search interface can be presented in response to a user action. For example, the travel search interface can be presented as part of a particular travel application (e.g., a mobile application) that has been opened by the user or otherwise executed. Alternatively, in some implementations, the travel search interface is presented as part of a web interface, e.g., through a browser of a user device (e.g., a mobile device, tablet device, laptop, or desktop computer).

The travel search interface can be presented for a particular mode. For example, a travel application can include a number of different menu options for respective modes that provide different information. The modes can include, for example, a search mode for performing a travel search using the travel search interface. Other modes can include a history mode that can display previously searched travel in a history interface, an itinerary mode that can display particular previously generated travel itineraries in an itinerary interface, and a visits mode for displaying an interface for identifying particular individuals to visit as will be described in greater detail below.

The travel search interface provides a number of travel search parameters that the user can specify. In some implementations, the user is able to request a greater or fewer number of travel search parameters than those initially presented. The travel search parameters presented can depend on the type of search. For example, travel search parameters for a hotel search can be different than travel search options for a flight search. For a flight search, the presented travel search parameters can include one or more of an origin location, a destination location, departure date ranges, duration of stay ranges, number of travelers, and other search parameters. For a hotel search, the presented travel search parameters can include one or more of hotel city, arrival date, number of nights, room type, and number of guests. A reduced set of essential travel search parameters can be initially presented (e.g., origin, destination, and dates). The user can then request additional travel search parameters be presented.

The system provides a suggestion of a particular person to visit (step 104). The suggestion can be provided within the presented travel search interface (e.g., provided within the travel search interface when displayed). Alternatively, the suggestion can be provided within a different mode, for example, the visits mode (e.g., in a mode selected from the travel search interface).

In some implementations, the suggestion is determined from a collection of individuals previously selected by the user. For example, the user can designate a collection of individuals during a setup stage. The collection of individual users can be associated with a particular social site that the user belongs to. The user can select the members of the social site associated with the user or a subset of members as available for suggestions.

Alternatively, in some implementations, the user specifies each individual to be included in the collection of individuals. This can include providing additional information about each specified individual, for example, a location city or closest airport for each.

The system can determine which person to provide as a suggestion according to particular criteria. In some implementations, the criteria designates that the suggestion is a random selection from the collection of individuals. The random selection can be performed based on an association of an identifier for each individual in the collection of individuals and values generated by a random number or pseudo-random number generator. Various algorithms can be used for random selection of a person from a collection of individuals.

In some other implementations, the random selection is bounded by one or more additional criteria. For example, the size of the collection of individuals can be an addition criterion. If the collection of individuals is small (e.g., 10 people), a suggestion may only be triggered occasionally. For example, every five times the user opens the travel application, a suggestion will be provided. Alternatively, if the collection of individuals is large (e.g., more than 100 people), a suggestion may be triggered every time the user opens the travel application.

In some implementations, a distanced metric is used as a criterion. For example, people in the collection of individuals that are within a specified distance from the user (e.g., 100 miles) can be excluded from being provided as a suggestion. Similarly, those individuals that exceed a certain distance from the user can also be excluded for short duration trip suggestions (e.g., a weekend). For example, for a person in San Francisco, a suggestion would not be provided to visit a person in Europe for a weekend.

The suggestion can be provided as one or more display elements e.g., in the travel search interface or a visits interface. For example, the suggestion can include one or more of the person's name, an image of the person, the location to visit (e.g., San Francisco, Calif.), and an airfare cost. In some implementations, the price of the airfare displayed is a lowest average round-trip airfare for a particular one of several possible date ranges, for example, a lowest average price for travel over the next four weekends to the location associated with the suggested person (e.g., an airport closest to the person).

The system optionally receives user input for a new suggestion (step 106). For example, the user can provide a particular input triggering a new suggestion. In some implementations, a user interface element (e.g., a button) can be used to request a new random selection of a suggested person to visit. Alternatively, in some other implementations, a mobile device (e.g., including one or more accelerometers) can be shaken or otherwise moved in order to trigger a request for a new random selection of a suggested person to visit.

In some implementations, an initial selection of the provided suggestion results in a visits interface associated with a visits mode being displayed. Alternatively, the user can directly select the visit mode from a menu.

The visits interface provides additional information about the provided suggestion as well as provides interface elements for obtaining a new suggestion from among the collection of individuals. The user can trigger the new suggestion multiple times, for example, by repeatedly selecting a user interface button or shaking a mobile device. After each trigger event, a new suggestion is provided to the user, e.g., as a highlighted or separate display information for the suggested person in the visits interface.

The system provides one or more travel options for visiting the suggested person (step 108). Presenting one or more travel options can include displaying a price for each of a specified number of upcoming dates. For example, the visits interface can display the lowest average round-trip airfare for traveling to the suggested person (e.g., identified by a closest airport or other criteria). Additionally, each price can have an associated date or date range.

In some implementations, the system computes the travel options when the current selection is made for a person to visit. In some other implementations, the system pre-computes travel options. For example, the system can pre-compute travel options for all people in the collection of individuals. Alternatively, the system can pre-compute a specified number of next random suggestions before a request is received to suggest a new person and pre-compute travel options for those people.

In some implementations, the dates represent consecutive weekends from the present date. For example, a price for the next four weekends can be displayed. The weekend can be defined as Friday-Sunday, for example by default. However, in some other implementations, users specify preferred travel dates for visiting people (e.g., Saturday-Monday). Additionally, travel dates can depend on the distance of the person from the user, for example Saturday-Sunday for people within a specified distance but Friday-Sunday for those that are further away.

The system receives a selection of particular travel dates (step 110). The user can select one of the provided one or more travel options. For example, the user can select a particular weekend of travel based on the presented travel dates and pricing (e.g., using a cursor or touch input).

The system provides travel results for the selected travel dates (step 112). The travel results can include a display of different airlines, a number of stops, and prices. For example, a grid display can be presented showing lowest round-trip pricing as a function of airline and number of stops (e.g., "Airline 1" can have a first price entry for a nonstop flight and a second price entry for routes having up to one stop). In some implementations, a map interface is selectably provided that illustrates the different flight routes from the departure to the destination.

The system builds a travel itinerary for the travel dates based on user input (step 114). The itinerary includes a departure leg and a return leg. Each leg defines a routing between the origin and destination airports. Each leg can include multiple segments (e.g., specific non-stop flights). For example, if a leg from San Francisco (SFO) to Boston (BOS) includes a stop in Chicago (ORD), then the leg includes segments SFO to ORD and ORD to BOS.

After specifying a particular airline and stops from the travel results, the user can further specify particular flight times for the one or more flights of each leg. In some implementations, additional dimensions are specified, for example, class of travel or seat selection.

In some implementations, options are provided for booking the itinerary. For example, one or more options can be provided for third party booking sites from which the itinerary can be purchased. Upon selection of a particular third party booking site, the itinerary can be sent to the third party booking site to complete the booking process.

Figure 2:
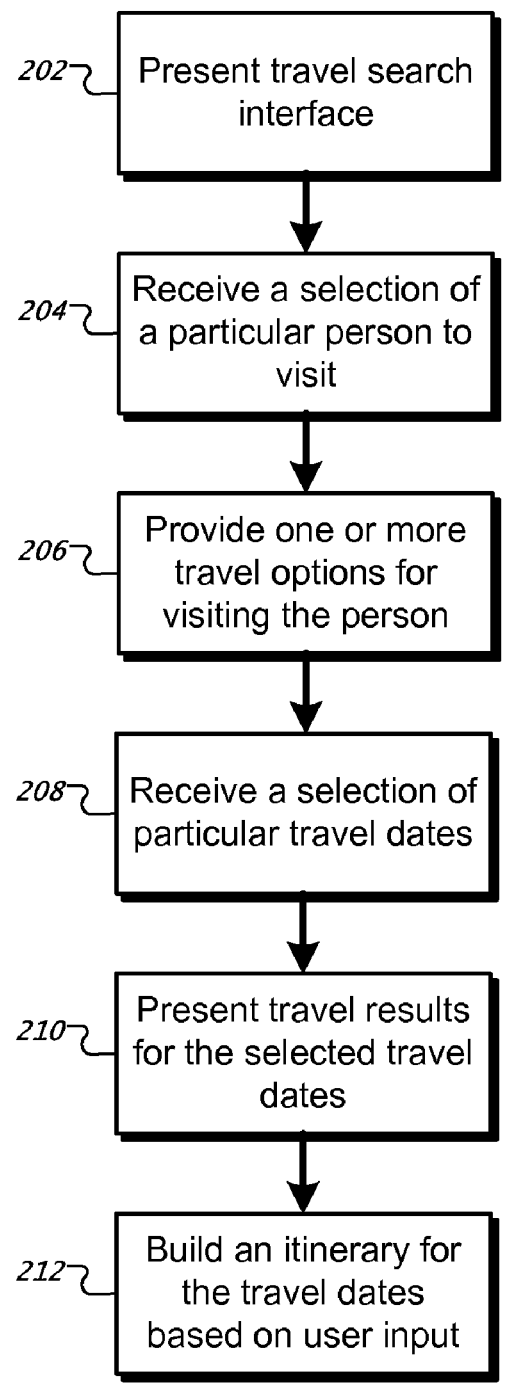
FIG. 2 is a flow diagram of an example process for determining travel based on a selected person.

FIG. 2 is a flow diagram of an example process 200 for determining travel based on a selected person. For convenience, the process 200 will be described with respect to a system, including one or more computers, that performs the process 200.

The system presents a travel search interface (step 202). The travel search interface can be presented in response to a user action. For example, the travel search interface can be presented as part of a particular travel application (e.g., a mobile application) that has been opened by the user or otherwise executed. Alternatively, in some implementations, the travel search interface is presented as part of a web interface, e.g., through a browser of a user device (e.g., a mobile device, tablet device, laptop, or desktop computer).

The travel search interface can be presented for a particular mode similar to that as described above with respect to FIG. 1. For example, a travel application can include a number of different menu options for respective modes that provide different information. The modes can include, for example, a search mode for performing a travel search using the travel search interface. Other modes can include a history mode that can display previously searched travel in a history interface, an itinerary mode that can display particular previously generated travel itineraries in an itinerary interface, and a visits mode for displaying an interface for identifying particular individuals to visit as will be described in greater detail below.

The travel search interface provides a number of travel search parameters that the user can specify as described above with respect to FIG. 1. In some implementations, the user is able to request a greater or fewer number of travel search parameters than those initially presented. The travel search parameters presented can depend on the type of search. For a flight search, the presented travel search parameters can include one or more of an origin location, a destination location, departure date ranges, duration of stay ranges, number of travelers, and other search parameters.

The system receives a selection of a particular person to visit (step 204). In particular, the user can enter a visits mode. The visits mode can provide a selection interface that allows the user to browse and select a particular person from a collection of individuals. The collection of individuals, as described above, can be identified from an account with a social site or individually specified by the user.

In some implementations, the selection interface is presented as a tumbler that allows the user to scroll through a list of people in the collection of individuals. For example, in mobile device scenarios including a touch interface, the user can drag a finger in a respective direction to scroll in different directions. The user can select a person directly (e.g., by clicking or touching the person's identifier, for example, a name). In some implementations, the person positioned in the center of the tumbler interface is automatically selected. The user can change the selection by scrolling the tumbler such that a different person is in the center position.

The system presents one or more travel options for visiting the selected person (step 206). The travel options can include pricing information for one or more dates as described above with respect to FIG. 1. The system receives a selection of particular travel dates (step 208).

The system provides travel results for the selected travel dates (step 210). The travel results can include a display of different airlines, number of stops, and prices. For example, a grid display can be presented showing lowest round-trip pricing as a function of airline and number of stops. In some implementations, a map interface is selectably provided in response to a user input that illustrates the different flight routes from the departure to the destination.

The system builds an itinerary for the selected travel dates based on user input (step 212). After specifying a particular airline and stops from the travel results, the user can further specify particular flight times for the one or more flights of each leg. In some implementations, additional dimensions are specified, for example, class of travel, or seat selection.

In some implementations, options are provided for booking the itinerary. For example, one or more options can be provided for third party booking sites from which the itinerary can be purchased. Upon selection of a particular third party booking site, the itinerary can be sent to the third party booking site to complete the booking process.

Figure 3:
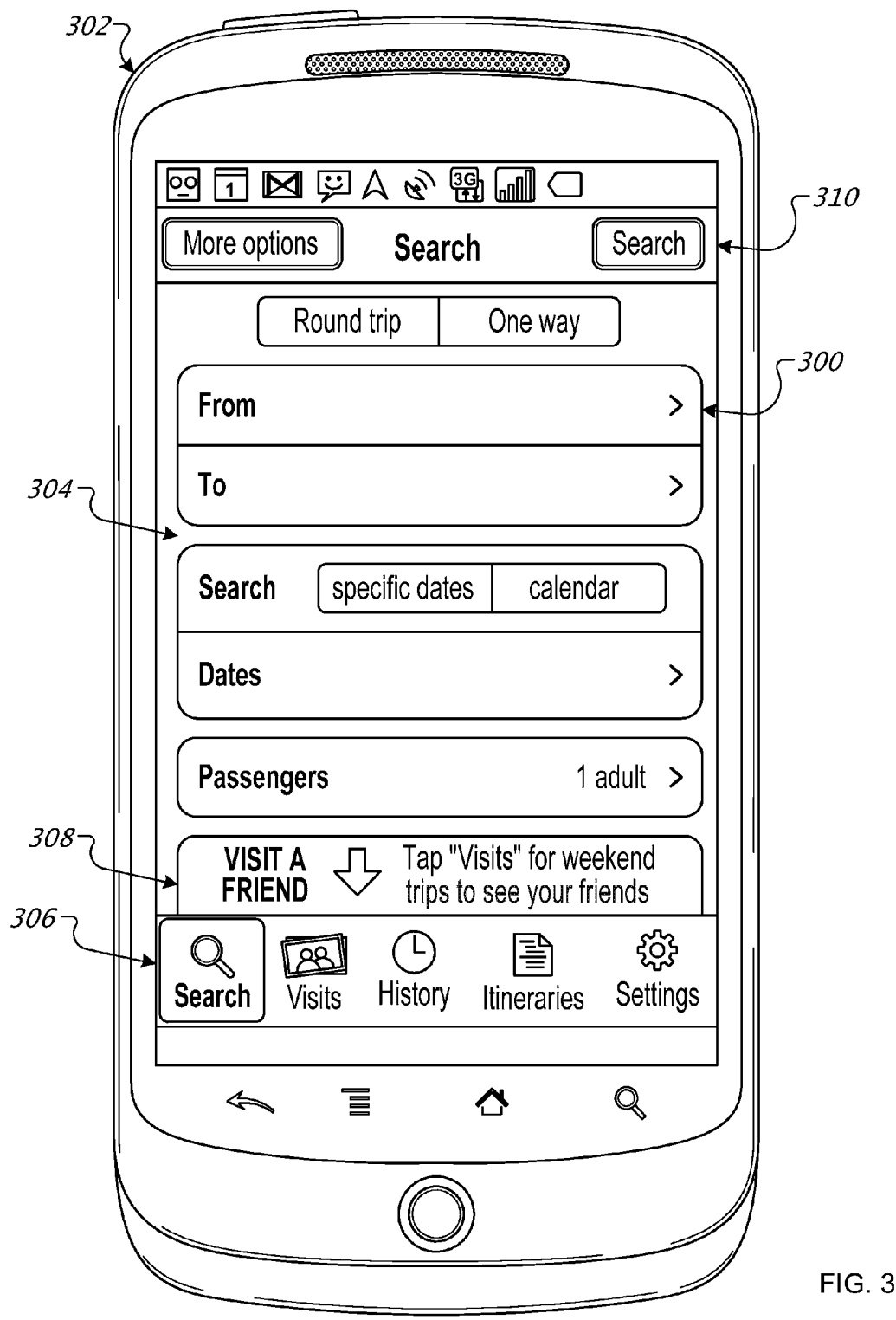
FIG. 3 shows an example travel search interface.

FIG. 3 shows an example travel search interface 300. The travel search interface 300 is shown as displayed on a mobile device 302. However, the travel search interface 300 can be displayed on other types of user devices including those having touch screen displays and those having non-touch screen displays. In some implementations, the travel search interface 300 is displayed on a touch display such that the user can interact with displayed elements using touch inputs.

The travel search interface 300 includes a number of flight travel search parameters 304. The combination of these parameters can then be used to search for flights that satisfy the flight travel search parameters. For example, a user can select a search button 310 on the travel search interface 300 to initiate a search.

The displayed flight travel search parameters 304 shown in the travel search interface 300 include a flight type, an origin, and a destination. The flight type indicates whether the flight is one way or round trip. The user can select (e.g., by touch or using a cursor) the flight type. Additionally, a default selection can be made when the travel search interface 300 is presented. As shown in FIG. 3, the "round trip" flight type is shown as highlighted, indicating selection.

The origin and destination allow for user input specifying a city or specific airport from which a flight will originate and arrive. For example, the origin can be specified by input to a corresponding text field for inputting a city or airport code. Alternatively, selection of the origin can result in a drop down or other listing of cities and/or airports. In some other examples, a search interface is provided in which the user can inputs some or all of a city or airport name and search for matching results. Similarly, the destination can be specified in a text field or using drop down listing for inputting a city or airport code. The user can select more than one airport for a given city or metropolitan area. In some implementations, specifying a city results in a presentation of one or more airports for selection.

In some implementations, a user specifies preferred airports or cities. For example, a user can establish preferences including a default origin location (e.g., the user's home city or current location) as well as generate a list of frequent destinations from which to select.

The displayed flight travel search parameters also include a search mode and departure dates. The search mode indicates whether the flight search is for specific dates or flexible using a calendar. The user can select (e.g., by touch or using a cursor) the search mode. Additionally, a default selection can be made when the travel search interface 300 is presented. As shown in FIG. 3, the "specific dates" search mode is shown as highlighted indicating selection.

The dates indicate the departure and return dates. Other parameters can be included including those partially shown or hidden. For example, "passengers" allows a user to specify the number of travelers and is partially shown. In some implementations, a user scrolls the display to reveal additional flight travel search parameters (e.g., using a touch gesture or scroll bars).

Menu items 306 can also be presented. The menu items 306 can identify different modes of a flight search application. For example, the menu items 306 currently show that a search mode is selected. Consequently, the travel search interface 300 is displayed. Other menu items 306 can result in different displays relating to, for example, a visits mode, history mode, itineraries mode, and a settings mode, depending on the particular travel search application.

The travel search interface 300 further includes a prompt 308. The prompt 308 provides information to the user indicating that the user can use the "visits" mode to identify travel to visit a particular individual. This individual can be suggested once the visits interface is displayed or manually selected, as described above with respect to FIGS. 1 and 2.

Figure 4:
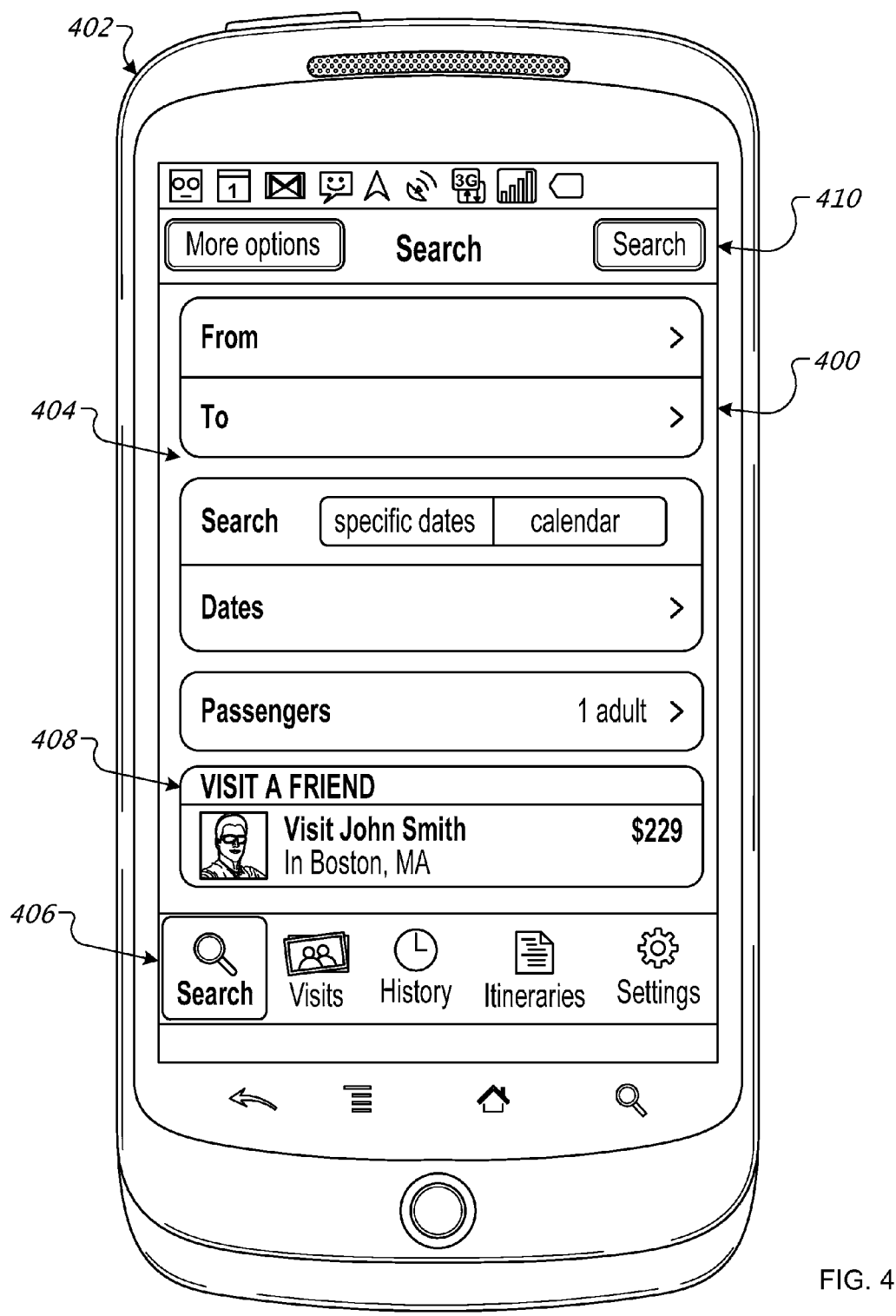
FIG. 4 shows an example travel search interface including a travel suggestion.

FIG. 4 shows an example travel search interface 400 including a travel suggestion. The travel search interface 400 is shown as displayed on a mobile device 402. However, the travel search interface 400 can be displayed on other types of user devices including those having touch screen displays and those having non-touch screen displays. In some implementations, the travel search interface 400 is displayed on a touch display such that the user can interact with displayed elements using touch inputs.

The travel search interface 400 includes a number of flight travel search parameters 404. The combination of these parameters can then be used to search for flights that satisfy the flight travel search parameters. For example, a user can select a search button 410 on the travel search interface 400 to initiate a search.

The displayed flight travel search parameters 404 shown in the travel search interface 300 include a flight type, an origin, and a destination. The flight type indicates whether the flight is one way or round trip. The origin and destination allow for user input specifying a city or specific airport from which a flight will originate and arrive.

The displayed flight travel search parameters also include a search mode and departure dates. The search mode indicates whether the flight search is for specific dates or flexible using a calendar.

The dates indicate the departure and return dates. Other parameters can be included including those partially shown or hidden. For example, "passengers" allows a user to specify the number of travelers and is partially shown. In some implementations, a user can scroll the display to reveal additional flight travel search parameters (e.g., using a touch gesture or scroll bars).

Menu items 406 are also presented. The menu items 406 can identify different modes of a flight search application. For example, the menu items 406 currently show that a search mode is selected. Consequently, the travel search interface 400 is displayed.

The travel search interface 400 further includes a travel suggestion 408. The travel suggestion 408 can be provided as one or more display elements in the travel search interface. For example, the suggestion can include one or more of the person's name (e.g., "John Smith"), an image of the person, the location to visit (e.g., Boston, Mass.), and an airfare cost. In some implementations, the price of the airfare displayed is a lowest average round-trip airfare for a particular one of several possible date ranges, for example, a lowest average price for travel on a specified number of different date ranges (e.g., over the next four weekends) to the identified location of the suggested person.

Figure 5:
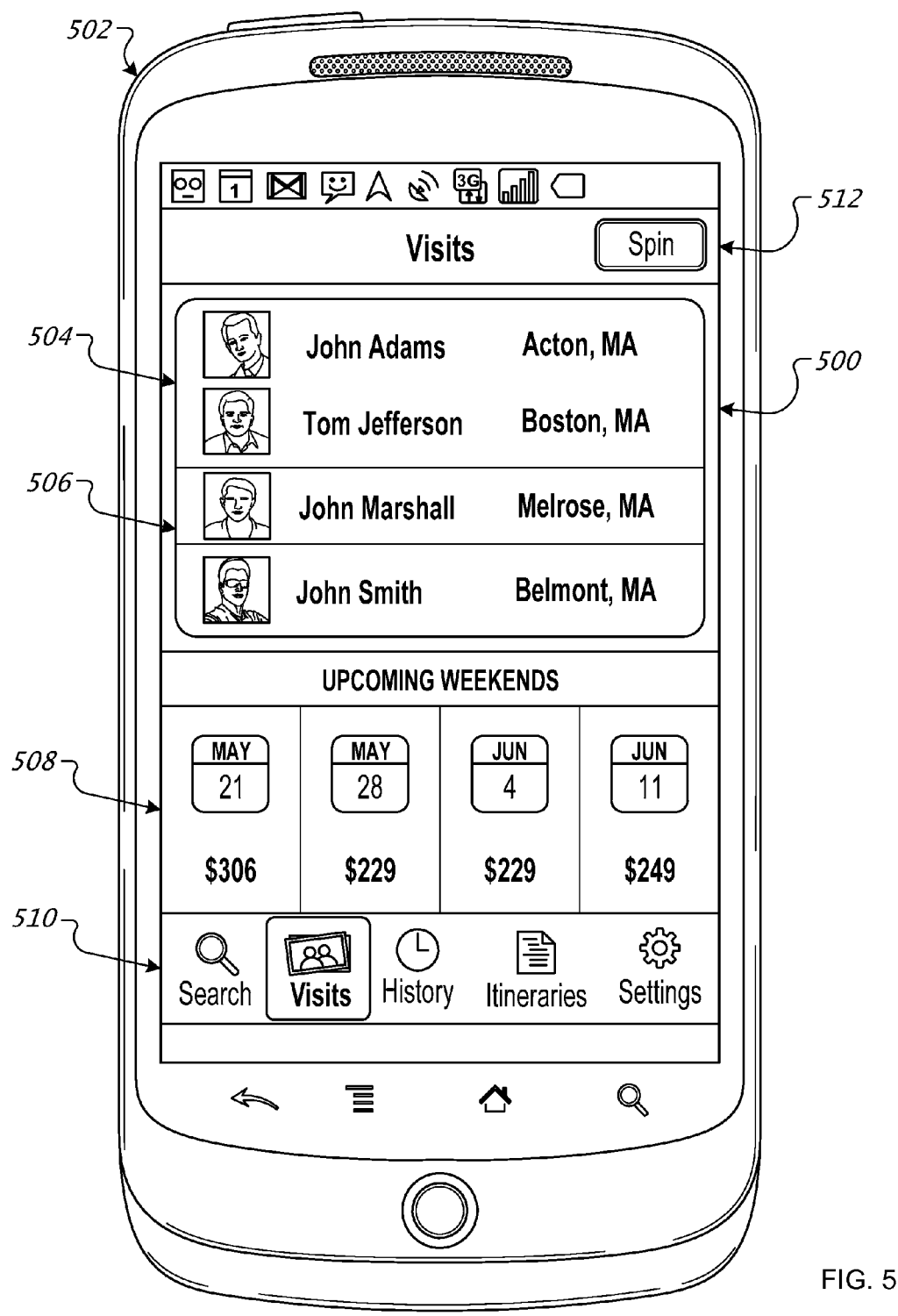
FIG. 5 shows an example visit interface for selecting travel based on a selected person.

FIG. 5 shows an example visit interface 500 for selecting travel based on a selected person. The visit interface 500 is shown as displayed on a mobile device 502. However, the visit interface 500 can be displayed on other types of user devices including those having touch screen displays and those having non-touch screen displays.

The visit interface 500 can be displayed, for example, in response to a user selection of a "visits" menu item of the menu items 510. The menu items 510 can identify different modes of a flight search application. Alternatively, in some implementations, the visit interface 500 is displayed in response to a user selection of a suggestion in a travel search interface. For example, in response to a user selection of the displayed travel suggestion 408 in FIG. 4.

The visit interface 500 includes a person selection portion 504 for selecting a person from a group of individuals. For each person in the group of individuals shown in the person selection portion 504, identifies the person (e.g., by name) as well as their location (e.g., city and state).

In some implementations, the person selection portion 504 presents a tumbler or other graphical elements that allow a user to browse individuals from the group of individuals. For example, in the tumbler example shown in FIG. 5 a user can manually move the representation up or down (e.g., using a touch gestures) to scroll through the collection of individuals. Additionally, this allows for a larger number of individuals to be available for selection than displayed at any one point in time in the person selection portion 504.

A currently selected individual 506 is visually indicated (e.g., using highlighting, coloring, borders, etc.). The currently selected individual can be the individual positioned in the center of the person selection portion or the displayed person selected by the user. Alternatively, the currently selected individual 506 can correspond to a suggested person to visit. For example, the suggested person can be the same as provided in a travel search interface (e.g., suggested person 408) or can be a suggested person provided in response to the user being presented with the visits interface 500.

In some implementations, the user requests a new random suggestion of a person to visit from the collection of individuals. For example, selection of the spin button 512 can result in a new suggestion presented as the currently selected individual 506. In some implementations, the person selection portion 504 is animated, for example, as a spinning tumbler, to illustrate the random selection. In some other implementations, the user can initiate the request for a new random suggestion by shaking the device, for example, a mobile device having one or more accelerometers or other motion sensing devices.

A travel options portion 508 of the visits interface 500 provides a display of potential travel dates to visit the currently selected individual 506. In particular, as shown in FIG. 5, the travel options portion 508 displays a lowest average round-trip price for four different weekends of travel. For each of the four options, a price is shown as well as a calendar representation of the departure date. In some implementations, the lowest average price or prices can be indicated, for example by coloring, highlighting, or other visual effect. If the user requests a new suggestion or manually specifies a different individual, the travel options portion 508 can be updated to display prices computed for the corresponding destination of the newly selected person.

The price indicates the lowest average round-trip price from the user's departure location, for example, a closest or specified airport to the airport associated with the selected person. The airport associated with the selected person can be a closest one or more airports. For example, for a selected person living in Palo Alto, Calif., there may be multiple nearby airports, e.g., within a specified distance from the selected person's location, to which the user can travel including San Francisco International Airport, San Jose International Airport, and Oakland International Airport. In some implementations, the system identifies a lowest average price taking into account flight itineraries with respect to each of these airports. The user can have the option of selecting a flight to a particular location when viewing flight results for a selected travel date.

Figure 7:
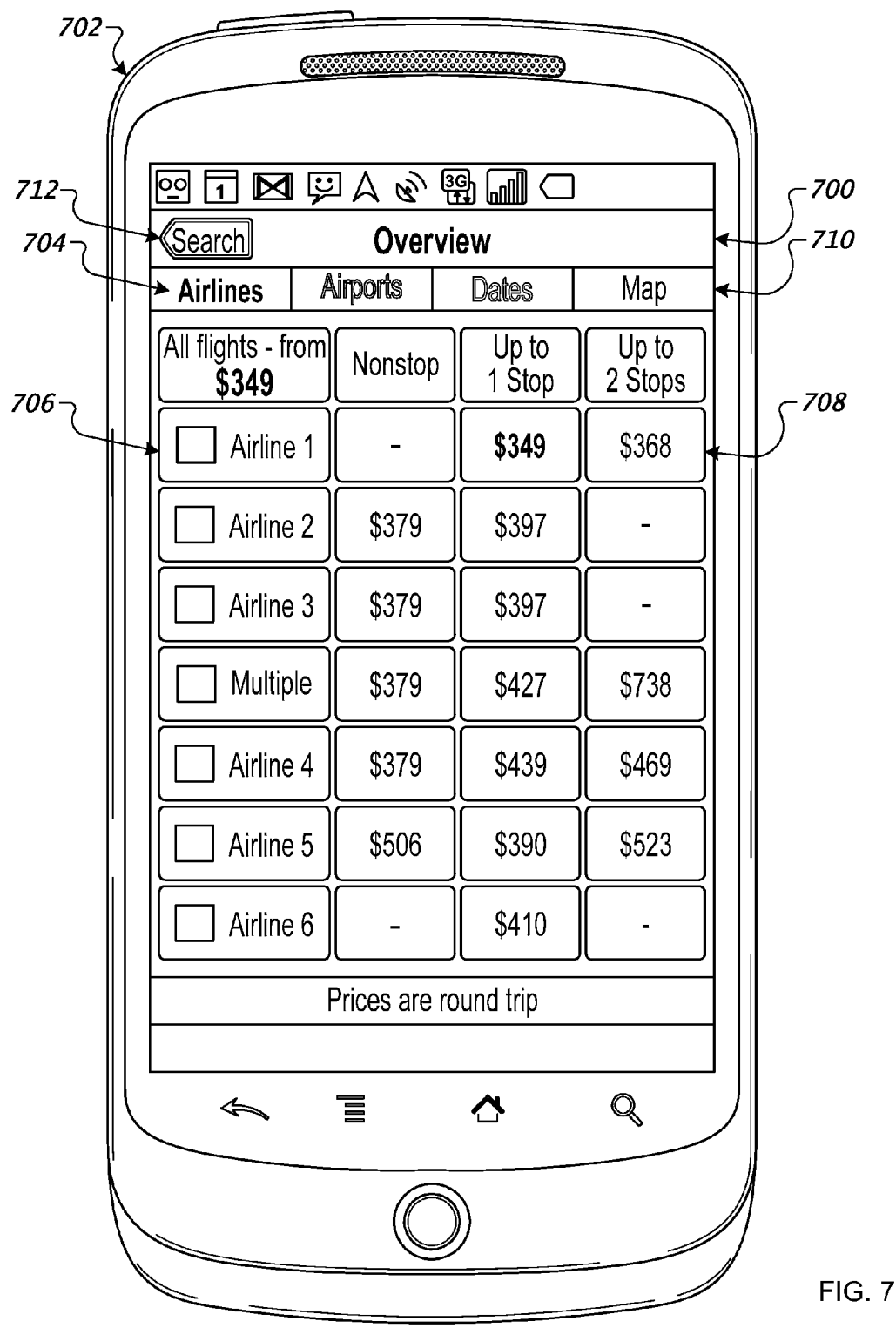
FIG. 7 shows an example travel results interface showing travel results for visiting the selected person.
Figure 8:
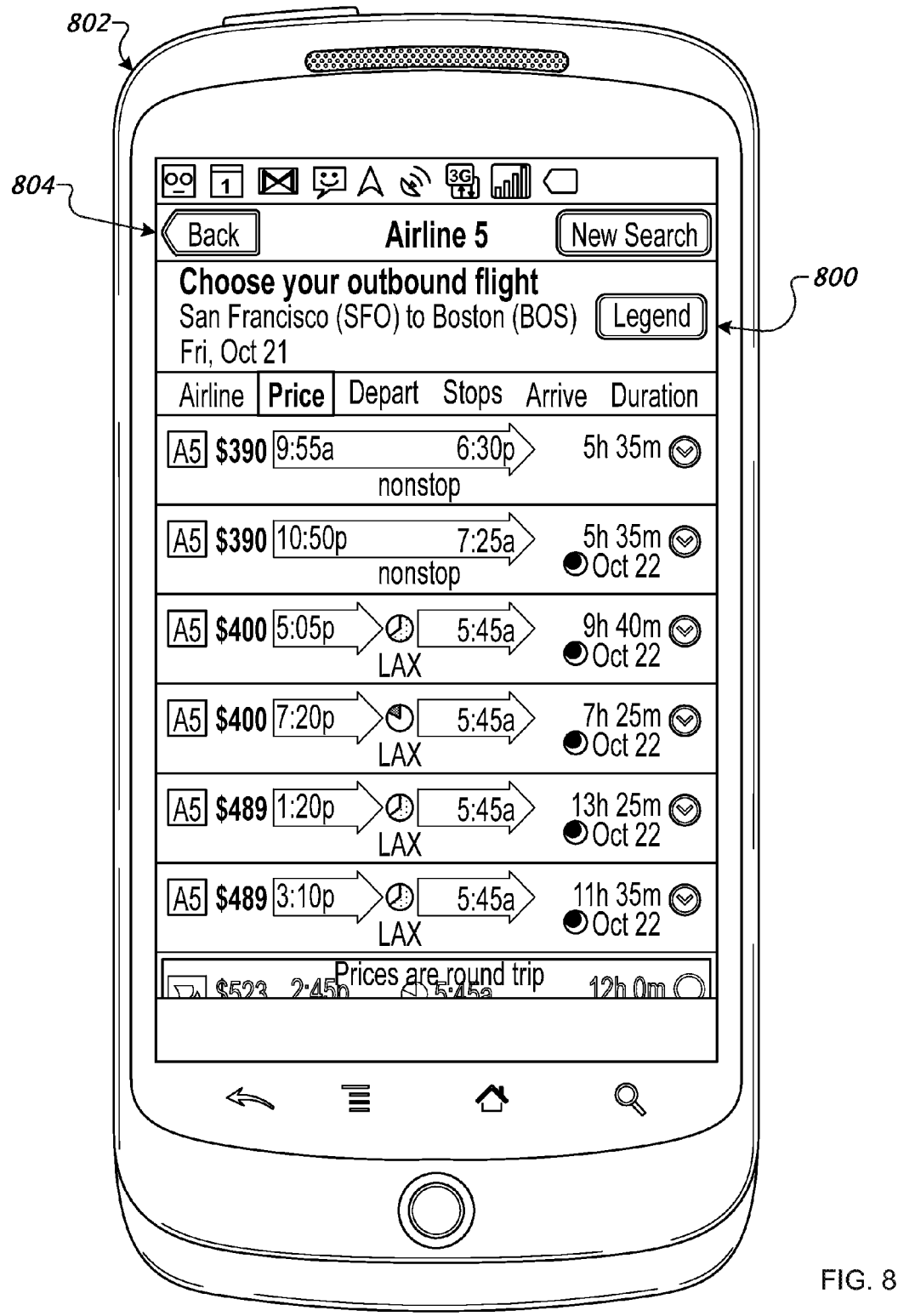
FIG. 8 shows an example travel results interface for selecting a particular flight leg.
Figure 9:
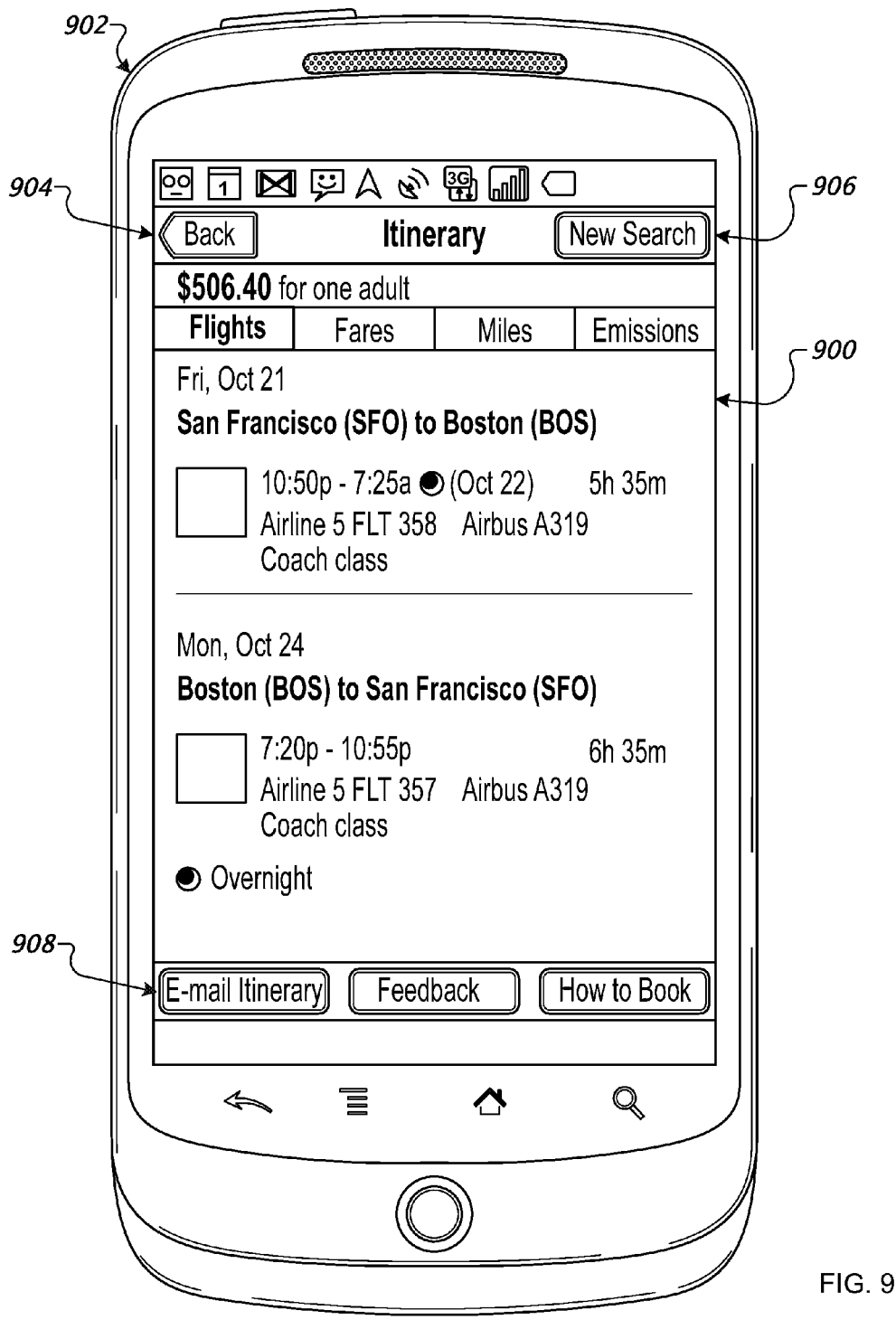
FIG. 9 shows an example travel itinerary interface including a specified flight itinerary.

The user can select a particular travel dates from the travel options portion 508. Once selected, travel results for the selected departure and return dates are presented in order to build an itinerary. Example travel results and itinerary interfaces are shown in FIGS. 7-9 below.

Figure 6:
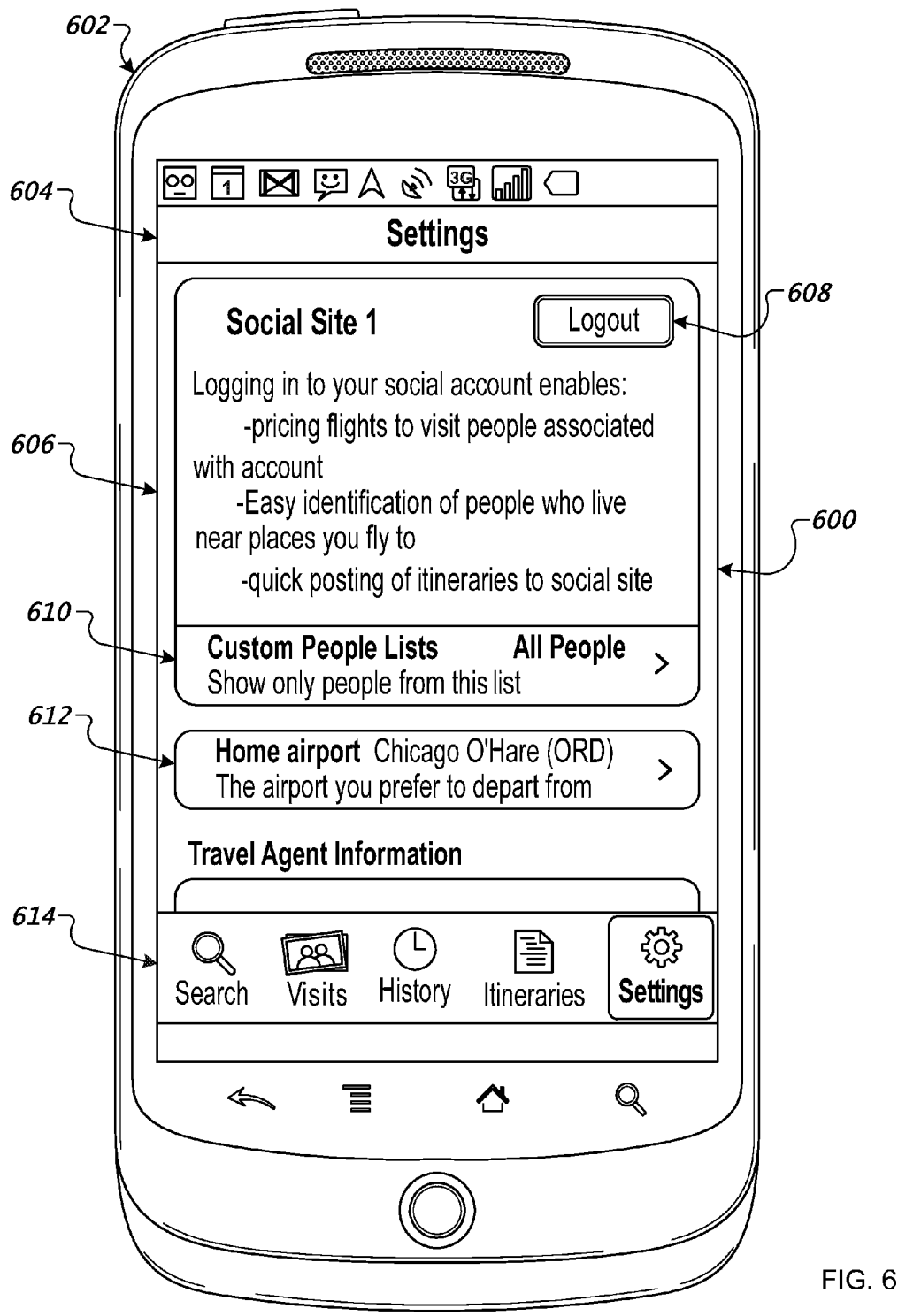
FIG. 6 shows an example travel settings interface.

FIG. 6 shows an example travel settings interface 600. The travel settings interface 600 is shown as displayed on a mobile device 602. However, the travel settings interface 600 can be displayed on other types of user devices including those having touch screen displays and those having non-touch screen displays.

The travel settings interface 600 can be displayed, for example, in response to a user selection of a "settings" menu item of the menu items 614. The menu items 614 can identify different modes of a flight search application.

The travel settings interface 600 includes account setup 604, custom people lists 606, and travel preference 608. The account setup 604 allows a user to use an existing account on one or more social sites to identify a collection of individual from which travel suggestions can be provided. The user can login to their account with a particular social site. The user can also log out of the social site such that the travel suggestions do not have access to the group if individuals. The user can logout, for example, using logout button 610.

The custom people lists 606 allows the user to specify the members of the collection of individuals from which suggestions are chosen. For example, the user can be presented with a list of all the individuals identified in the social site. The user can then eliminate particular individuals. In some implementations, the user builds an independent collection of individuals by providing names and locations for each member of the group.

The travel preference 608 allows the user to specify different travel preferences. For example, as shown in FIG. 6, the user can specify a home airport indicating a preferred departure airport for all travel searches including suggested travel. In some other implementations, other travel preferences can be specified. For example, a maximum distance or flying time (e.g., 7 hours maximum), travel date constraints (e.g., only weekends), or price limits (e.g., only suggestions where the average round-trip cost is $500 or less).

FIG. 7 shows an example travel results interface 700 showing travel results for visiting the selected person. The travel results interface 700 is shown as displayed on a mobile device 702. The travel results interface 700 can be provided, for example, in response to the user selection of a particular travel dates from the travel options portion 508 of FIG. 5 for travel to visit a selected person.

The travel results interface 700 includes display options including an airline view 704 and a map view 710. The airline view 704 is shown as selected. The map view 710 displays different flight routes between the origin and destination on a map interface. The user can return to the prior search interface using search button 712.

The airline view 704 provides a grid display 708 showing airlines and average lowest round-trip prices based on a number of stops. For example, as shown in grid display 708, prices for various airlines including mixed airline travel are displayed as rows while the corresponding prices are displayed with respect to columns indicating a number of stops. Thus, for example, "Airline 4" includes prices for nonstop, up to one stop, and up to two stop flight routes between the origin and destination.

FIG. 8 shows an example travel results interface 800 for selecting a particular flight leg. The travel results interface 800 is shown as displayed on a mobile device 802.

The travel results interface 800 can be presented, for example, in response to the user selecting a particular airline and routing in the travel results interface 700 of FIG. 7. The user can return to the travel results interface 700, for example, by selecting the back button 804.

The travel results interface 800 shows distinct flight legs from the origin to the destination for the selected airline. For example, for travel from San Francisco to Boston, six different flight legs are shown for "Airline 5", e.g., of the travel results interface 700. Each of the flight legs show the departure time, arrival time, number of stops, and duration. If there is a stop, the location of the stop is shown (e.g., LAX for Los Angeles). The user can select a particular flight leg, e.g., with a cursor controlled by an input device or by touch input.

FIG. 9 shows an example travel itinerary interface 900 including a specified flight itinerary. The travel itinerary interface 900 is shown as displayed on a mobile device 902.

The travel itinerary interface 900 displays a user selected itinerary including flight details for both outbound and return legs and pricing. The user can return to the previous interface (e.g., selecting the returning leg) using a back button 904. Alternatively, the user can being a new flight search by selecting a new search button 906.

Menu options 908 provide options for e-mailing the selected itinerary, providing feedback on the travel search process or features, as well as information on how to book the itinerary. In some implementations, one or more third party booking sites are presented to the user. If selected, the user can be directed to a browser session that opens the selected third party booking site in order to complete purchase of the selected itinerary.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   providing, using one or more computers, a travel search interface to a user device, the travel search interface including one or more travel parameters and a suggestion of one or more people to visit from among a specified collection of individuals;
   receiving, through the user device, a user selection of a suggested person;
   providing, to the user device, one or more date range and price combinations for traveling to a city associated with the selected suggested person; and
   generating a travel itinerary for the selected travel date range.

2. The method of claim 1, further comprising:
   receiving, through the user device, a user input requesting a new suggestion of one or more people to visit; and
   providing, to the user device, the new suggestion of one or more people.

3. The method of claim 1, wherein providing, to the user device, one or more date range and price combinations includes providing a price for travel over a specified number of future weekends.

4. The method of claim 1, wherein the suggestion is provided to the user device in response to a trigger criteria, the trigger criteria being associated with a number of people in a social group of the user.

5. The method of claim 1, wherein generating a travel itinerary includes receiving a user selection of two or more flight legs for the date range.

6. The method of claim 1, wherein the date range and price combinations are pre-computed for each of a plurality of people available as suggestions.

7. The method of claim 1, wherein the suggestion is randomly generated.

8. A method performed by data processing apparatus, the method comprising:
   providing, using one or more computers, a travel search interface to a user device, the travel search interface including identifiers for a plurality of people;
   receiving, through the user device, a selection of a particular person of the plurality of people;
   providing, to the user device, one or more date range and price combinations for traveling to a destination to visit the selected person; and
   generating a travel itinerary for the selected travel date range.

9. The method of claim 8, wherein the plurality of people belong to a user specified group.

10. The method of claim 8, wherein the user interface allows the user to scroll through the plurality of people.

11. The method of claim 8, wherein generating a travel itinerary includes receiving, through the user device, a user selection of two or more flight legs for the date range.

12. The method of claim 8, wherein the date range and price combinations are pre-computed for each of a plurality of people available as suggestions.

13. A computer storage medium encoded with a computer program, the program comprising instructions that when executed by data processing apparatus cause the data processing apparatus to perform operations comprising:
- providing a travel search interface, the travel search interface including one or more travel parameters and a suggestion of one or more people to visit from among a specified collection of individuals;
- receiving a user selection of a suggested person;
- providing one or more date range and price combinations for traveling to a city associated with the selected suggested person; and
- generating a travel itinerary for the selected travel date range.

14. The computer storage medium of claim 13, the program comprising instructions that when executed by data processing apparatus further cause the data processing apparatus to perform operations comprising:
- receiving a user input requesting a new suggestion of one or more people to visit; and
- presenting the new suggestion of one or more people.

15. The computer storage medium of claim 13, wherein providing one or more date range and price combinations includes providing a price for travel over a specified number of future weekends.

16. The computer storage medium of claim 13, wherein the providing the suggestion is performed in response to a trigger criteria, the trigger criteria being associated with a number of people in a social group of the user.

17. The computer storage medium of claim 13, wherein generating a travel itinerary includes receiving a user selection of two or more flight legs for the date range.

18. The computer storage medium of claim 13, wherein the date range and price combinations are pre-computed for each of a plurality of people available as suggestions.

19. The computer storage medium of claim 13, wherein the suggestion is randomly generated.

20. A computer storage medium encoded with a computer program, the program comprising instructions that when executed by data processing apparatus cause the data processing apparatus to perform operations comprising:
- providing a travel search interface, the travel search interface including identifiers for a plurality of people;
- receiving a selection of a particular person of the plurality of people;
- providing one or more date range and price combinations for traveling to a destination to visit the selected person; and
- generating a travel itinerary for the selected travel date range.

21. The computer storage medium of claim 20, wherein the plurality of people belong to a user specified group.

22. The computer storage medium of claim 20, wherein the user interface allows the user to scroll through the plurality of people.

23. The computer storage medium of claim 20, wherein generating a travel itinerary includes receiving a user selection of two or more flight legs for the date range.

24. The computer storage medium of claim 20, wherein the date range and price combinations are pre-computed for each of a plurality of people available as suggestions.

25. A system comprising:
- one or more computers operable to interact in order to perform operations comprising:
  - providing a travel search interface, the travel search interface including one or more travel parameters and a suggestion of one or more people to visit from among a specified collection of individuals;
  - receiving a user selection of a suggested person;
  - providing one or more date range and price combinations for traveling to a city associated with the selected suggested person; and
  - generating a travel itinerary for the selected travel date range.

26. The system of claim 25, further operable to perform operations comprising:
- receiving a user input requesting a new suggestion of one or more people to visit; and
- presenting the new suggestion of one or more people.

27. The system of claim 25, wherein providing one or more date range and price combinations includes providing a price for travel over a specified number of future weekends.

28. The system of claim 25, wherein the providing the suggestion is performed in response to a trigger criteria, the trigger criteria being associated with a number of people in a social group of the user.

29. The system of claim 25, wherein generating a travel itinerary includes receiving a user selection of two or more flight legs for the date range.

30. The system of claim 25, wherein the date range and price combinations are pre-computed for each of a plurality of people available as suggestions.

31. The system of claim 25, wherein the suggestion is randomly generated.

32. A system comprising:
- one or more computers operable to interact in order to perform operations comprising:
  - providing a travel search interface, the travel search interface including identifiers for a plurality of people;
  - receiving a selection of a particular person of the plurality of people;
  - providing one or more date range and price combinations for traveling to a destination to visit the selected person; and
  - generating a travel itinerary for the selected travel date range.

33. The system of claim 32, wherein the plurality of people belong to a user specified group.

34. The system of claim 32, wherein the user interface allows the user to scroll through the plurality of people.

35. The system of claim 32, wherein generating a travel itinerary includes receiving a user selection of two or more flight legs for the date range.

36. The system of claim 32, wherein the date range and price combinations are pre-computed for each of a plurality of people available as suggestions.

* * * * *